United States Patent [19]

Lance

[11] Patent Number: 5,507,559

[45] Date of Patent: Apr. 16, 1996

[54] ADJUSTABLE AND RELEASABLY CONNECTABLE LUMBAR SUPPORT ASSEMBLY

[75] Inventor: Mark A. Lance, Williamstown, Australia

[73] Assignee: Hendersons Industries Pty. Ltd., Australia

[21] Appl. No.: 211,190

[22] PCT Filed: Sep. 23, 1992

[86] PCT No.: PCT/AU92/00503

§ 371 Date: May 4, 1994

§ 102(e) Date: May 4, 1994

[87] PCT Pub. No.: WO93/05683

PCT Pub. Date: Apr. 1, 1993

[30] Foreign Application Priority Data

Sep. 24, 1991 [AU] Australia ............................ PK8543

[51] Int. Cl.[6] ................................................. A47C 7/42
[52] U.S. Cl. .......................... 297/284.5; 297/284.4; 297/463.1
[58] Field of Search .................... 297/284.1, 284.2, 297/284.3, 284.4, 284.5, 284.8, 440.1, 440.11, 463.1

[56] References Cited

U.S. PATENT DOCUMENTS

| 3,241,879 | 3/1966 | Castello et al. ................... 297/284.4 |
|---|---|---|
| 4,155,592 | 5/1979 | Tsuda et al. ........................ 297/284.2 |
| 4,462,635 | 7/1984 | Lance . | 
| 4,630,865 | 12/1986 | Ahs ........................................ 297/284.4 |
| 5,197,780 | 3/1993 | Coughlin ......................... 297/284.8 X |
| 5,217,278 | 6/1993 | Harrison et al. ................ 297/284.4 X |
| 5,314,236 | 5/1994 | Suzuki et al. ......................... 297/284.8 |
| 5,316,371 | 5/1994 | Bishai ................................. 297/284.1 X |

FOREIGN PATENT DOCUMENTS

| 7243674 | 8/1974 | Australia . |
|---|---|---|
| 19524/83 | 3/1985 | Australia . |
| 0296938 | 12/1988 | European Pat. Off. . |
| 2241426 | 3/1975 | France . |
| 1274003 | 7/1968 | Germany . |
| 3817977 | 11/1989 | Germany . |
| 4023824 | 2/1992 | Germany . |
| WO9313696 | 7/1993 | WIPO . |

*Primary Examiner*—Milton Nelson, Jr.
*Attorney, Agent, or Firm*—Lerner, David, Littenberg, Krumholz & Mentlik

[57] ABSTRACT

A lumbar support subassembly is disclosed including a support band extending across a seat back rest, the lumbar support band being releasably connectable at both ends, and relatively movable between a number of positions, including a position in which the support band can be separated from the seat back rest in a mounted position, and the effective length of the band can be varied by a motor whereby one end of the band can be moved with respect to the other end.

19 Claims, 6 Drawing Sheets

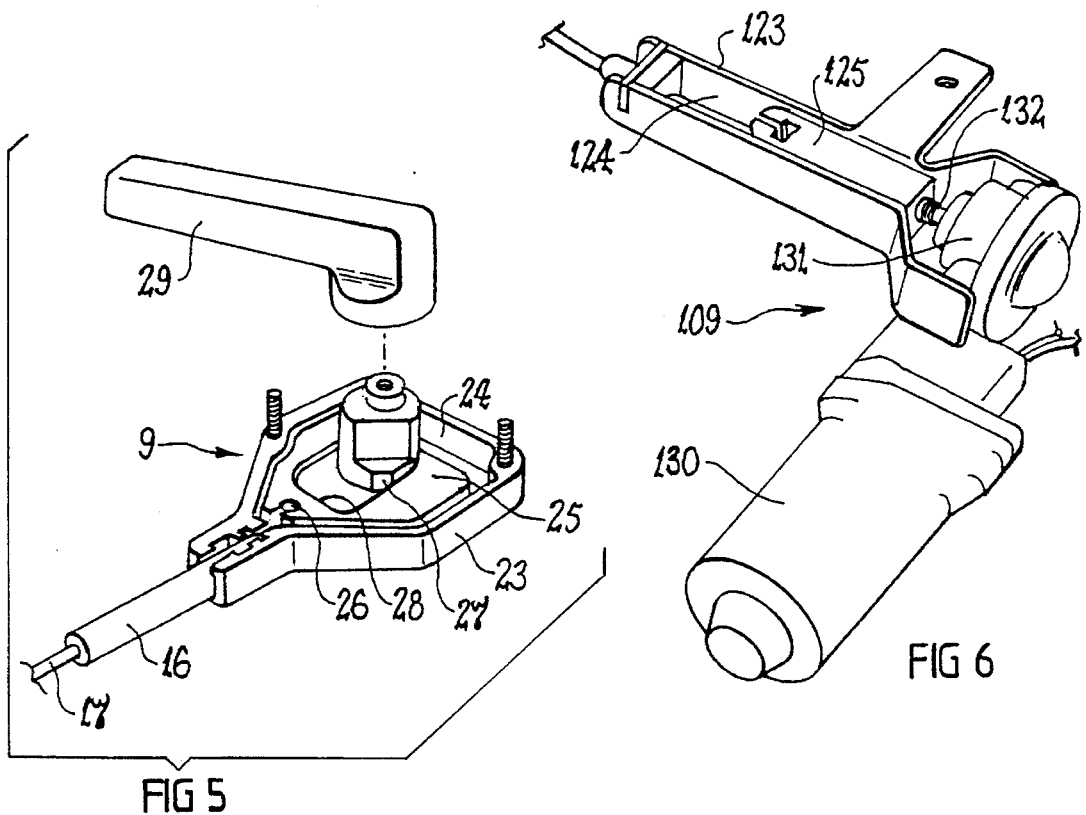
FIG 5
FIG 6
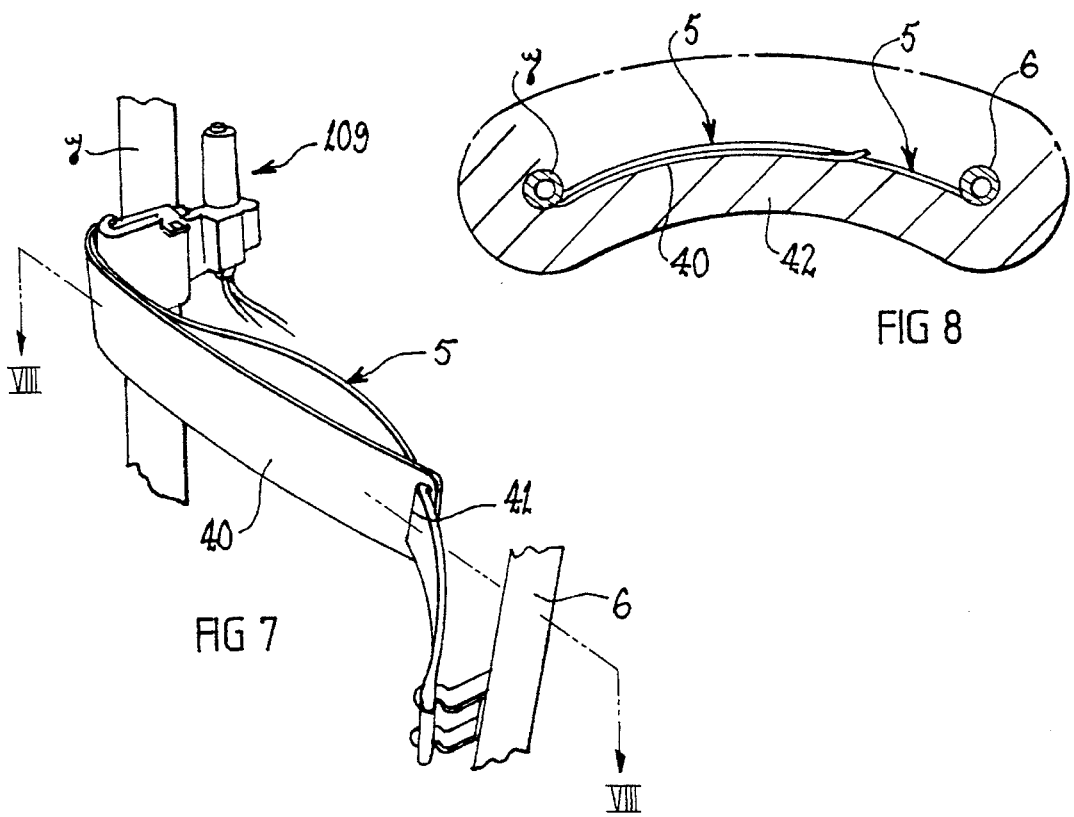
FIG 7
FIG 8

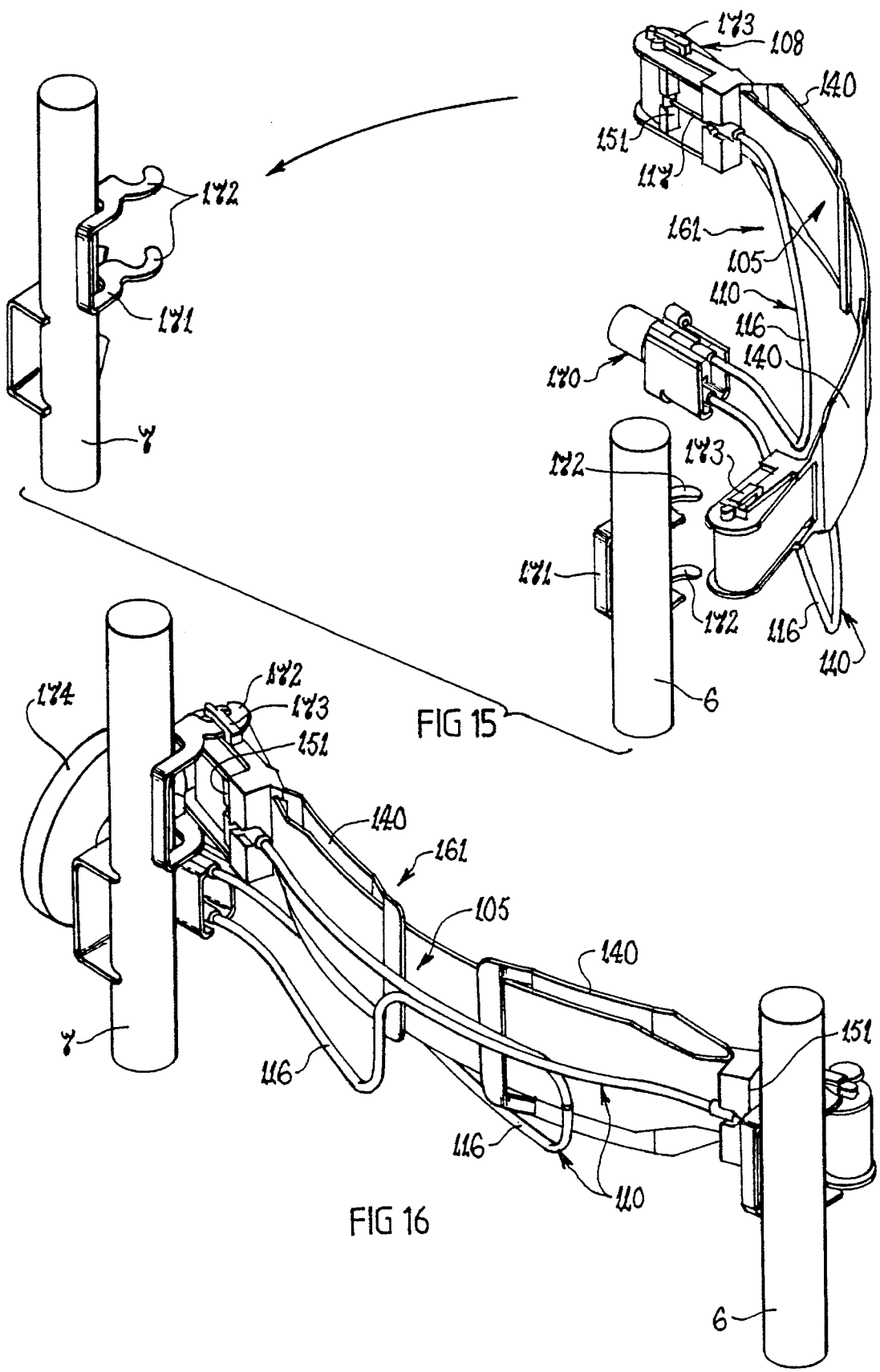

5,507,559

ADJUSTABLE AND RELEASABLY CONNECTABLE LUMBAR SUPPORT ASSEMBLY

FIELD OF THE INVENTION

This invention relates to adjustable lumbar support systems for seats and chairs, and is particularly although not exclusively concerned with such systems as used in association with motor vehicle seats. It will be convenient to hereinafter describe the invention with particular reference to motor vehicle seats, but it is to be understood that the invention has wider application. By way of example, the invention may be adopted in aircraft seats, train seats, shipboard seats, and chairs as used for office or recreational purposes.

BACKGROUND OF THE INVENTION

Adjustable lumbar support systems have achieved wide adoption in motor vehicles, particularly for the driver's seat, because of their significant contribution to driver comfort. A wide variety of such systems are available, and they generally suffer from one or more problems. Complexity of construction and consequent expense is a common problem, and less complicated and less expensive systems are usually deficient in operation. Another problem is lack of versatility.

The adjustable function of some of the known lumbar support systems is effected through a drive mechanism, which in most cases is either mechanical or electrical in nature. Vehicle manufacturers sometimes offer either mechanical or electrical systems to their customers, and consequently need to carry the requisite components for each. Prior to the present invention however, substantial differences have existed between the nature of the basic components required for each of the two alteratives, and that has added significantly to manufacturing costs.

It is an object of the invention, according to one of its aspects, to provide a lumbar support of relatively simple form. It is a further object of that aspect of the invention to provide means whereby the various components can be relatively located to suit ergonomic requirements.

It is an object of the invention according to another one of its aspects, to provide a lumbar support which enables convenient adoption of either a mechanical or an electrical drive mechanism.

Yet another object of the invention according to one of its aspects, is to provide means whereby any one of a plurality of interchangeable sub-assemblies can be adopted in a lumbar support system, according to customer requirements. By way of example, such interchangeable sub-assemblies may include mechanically driven and electrically driven sub-assemblies respectively.

SUMMARY OF THE INVENTION

In accordance with the first mentioned aspect of the invention, there is provided a lumbar support for a seat, including a lumbar support band adapted to extend across the frame of a seat back rest, mounting means at each end of said band whereby said band can be attached to each of two spaced side members of said frame, an operative portion of said band extending between said mounting means, at least one said mounting means having a static part which is attachable to said frame and a dynamic part which is attached to said operative portion and is movable relative to said static part so as to thereby vary the effective length of said operative portion, drive mechanism, and a flexible drive connection interconnecting said drive mechanism and said dynamic part so that said mechanism is operable to cause or permit said movement of the dynamic part.

The so-called "operative portion" of the band is that part of the overall length of the band which is operable to provide lumbar support, and in most cases that is essentially the portion of the band extending between the two side members of the frame to which the band is attached. The effective length of that portion is the length spanning the space between the side members and can be adjusted from a minimum length at which the operative portion is relatively taut between the frame side members to a maximum length at which the operative portion sags rearwardly under the pressure applied by the seat occupant. For the purpose of adjustment of that length, one end portion of the band may be fixed to one frame side member against relative movement, and the other end portion may be mounted on the other frame side member for movement relative thereto. In an alternative arrangement, both end portions could be movably mounted.

It is a feature of the arrangement referred to above that the actual drive mechanism can be located at any desired position on the seat frame, or other support. That is made possible by adopting a flexible drive connection between the drive mechanism and the adjustable band. In a preferred form, that drive connection includes a flexible cable. Thus, the drive mechanism, whether it be mechanical or electrical, can be mounted at a position which facilitates convenient actuation of that mechanism and which suits other manufacturing requirements. In the case of an electrical mechanism, the actuator switch, button, or the like, can be located remote from the mechanism, and its location will be selected to suit user requirements.

In a preferred form of the foregoing arrangement, the band is in the form of a strap-like section of elastomeric polymer or other suitable plastics material. The band is flexible so as to have a wrap-around effect and provide lumbar support along its span between the two side members of the frame. It may also have some degree of elasticity, which may be selected to provide a cushioning effect comparable to that of the resilient padding and/or springs of the seat assembly of which the frame is to form part.

According to another aspect of the invention, there is provided a lumbar support sub-assembly including a lumbar support band adapted to extend across the frame of a seat back rest, mounting means at each end of said band and each being releasably engagable with cooperable means on a seat back rest frame to permit said sub-assembly to be attached to and removed from said frame, an operative portion of said band extending between said mounting means, at least one said mounting means having a static part which is engagable with a said cooperable means and a dynamic part which is attached to said operative portion and is movable relative to the static part so as to thereby vary the effective length of said operative portion, and drive mechanism operable to cause or permit movement of said dynamic part in either of two opposite directions relative to said static part.

In a typical arrangement, the back rest frame has two laterally spaced side members, and the sub-assembly is adapted to extend between those side members so as to provide a lumbar support for the user of the seat assembly of which the frame forms part. Cooperable means as referred to will, under those circumstances, be provided on each side member. Because of the releasable engagement between the sub-assembly and the frame, one particular sub-assembly can be conveniently substituted for another.

Only one of the two mounting may have two relatively movable parts as referred to above, in which case that will be hereinafter called the active mounting means. In describing that type of arrangement, the other mounting means will be called the inactive or passive mounting means.

It is a feature of the foregoing arrangement that drive mechanism for adjusting the lumbar support band forms part of the sub-assembly. That drive mechanism is preferably connected to the active mounting means so as to interact between the dynamic and static parts of that means. The drive mechanism may be mechanical or electrical in nature, and it is preferred that the active mounting means is arranged so as to accept either a mechanical or an electrical drive mechanism, according to requirements.

The body of the band, including the strap-like part of that band, is preferably formed of an elastomeric polymer or other suitable plastics material as previously described. That is, the band preferably has flexibility and resilience as previously described. It is further preferred that the strap-like part of the band provides the span between the side members of the frame, or at least a substantial part of that span.

According to one arrangement incorporating the invention, in any of its aspects, a shield overlies at least part of the operative portion of the band so as to minimise frictional resistance to changes in that effective length. Such frictional resistance might arise, for example, because of contact between the band and cushioning material or padding in the seat with which the band is associated.

BRIEF DESCRIPTION OF THE DRAWINGS

Embodiments of the invention are described in detail in the following passages of the specification which refer to the accompanying drawings. The drawings, however, are merely illustrative of how the invention might be put into effect, so that the specific form and arrangement of the various features as shown is not to be understood as limiting on the invention.

In the drawings:

FIG. 5 is a partially exploded perspective view of one form of mechanical drive means suitable for use in the assembly shown in FIG. 1.

FIG. 6 is a view similar to FIG. 5 but showing an electrically operated drive mechanism.

FIG. 7 shows a lumbar support according to another embodiment of the invention attached to the back rest frame of a seat.

FIG. 8 is a diagrammatic sectional view of a seat back rest incorporating a lumbar support of the kind shown in FIG. 7.

FIG. 15 is a view similar to FIG. 10 but showing another embodiment of the invention.

FIG. 16 is a view similar to FIG. 15 but showing the lumbar support attached to the back rest frame of a seat.

DETAILED DESCRIPTION

Figure 1:
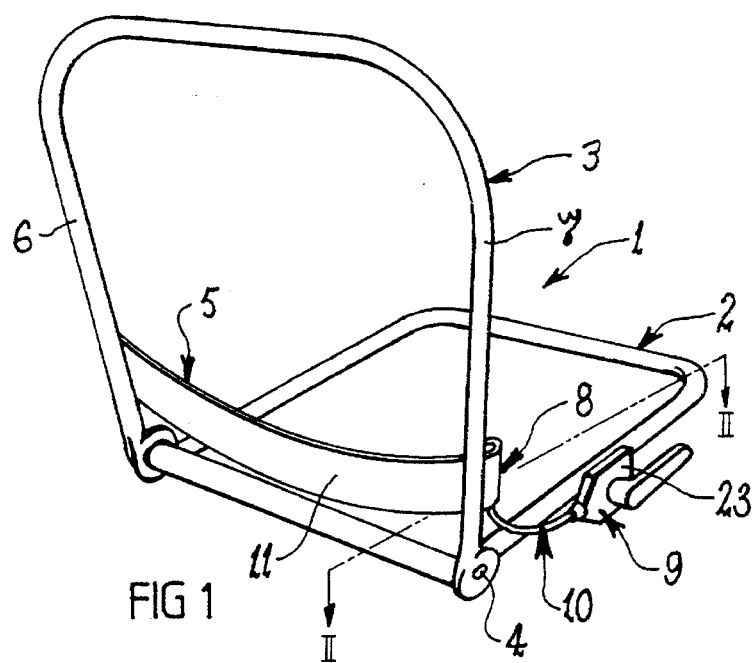
FIG. 1 is a diagrammatic view of a seat frame to which is attached a lumbar support according to one embodiment of the invention.

FIG. 1 shows in diagrammatic form, a seat frame 1 incorporating one embodiment of the invention according to one of its aspects. The frame 1 has a base part 2 and a back part 3, which may be pivotally connected at 4 to enable adjustment of the relative slope of the back part 3. Means for effecting such adjustment is known.

A lumbar support band 5 is attached to the frame part 3 in any appropriate manner, subject to that band 5 being capable of adjustment as hereinafter discussed. The location of the band 5 is selected according to its intended function. The frame part 3 forms part of the seat back rest and includes two laterally spaced primary side members 6 and 7, and the band 5 extends between those members as shown. In a complete seat assembly, a padded or cushioned back rest cover (not shown) will be attached to the frame part 3 and may be supported by springs or other means extending between the side members 6 and 7, or between other peripheral members of the frame part 3.

In the particular arrangement shown, one end portion of the band 5 is attached to the side member 6 so as to be held against relative movement, and the opposite end portion is connected to the side member 7 through mounting means 8 which permits relative movement between the band 5 and the member 7. That relative movement is for the purpose of adjusting the length of an operative portion of the band 5, which can be considered to be that part of the band length extending between the two members 6 and 7, or between supports provided on those members.

It is to be understood that both ends of the band 5 could be arranged for movement relative to the frame 1, but single end movement is described in the immediately following passages of this specification.

Adjusting means is connected to the movable end portion of the band 5 and is operable to cause variation in the length of the band operative portion. In the particular arrangement shown, that adjusting means includes a drive mechanism 9 and a drive connection 10 between that mechanism and the band 5. The drive mechanism 9 is shown attached to one side of the frame base 2, but it could be attached to the frame 1 at any other location, or it could be attached to any other appropriate support.

The band 5 may be of any suitable form and of any suitable material. It is preferred however, that it is moulded or otherwise formed from a plastics material such as an elastomeric polymer, which has some degree of resilience. The operative or lumbar supporting portion of the band 5 is that portion 11 extending between, or substantially between, the frame members 6 and 7, and is preferably of strap-like form. The band portion 11 is flexible so as to have a wrap-around effect on the seat occupant, and it may have a degree of resilience to permit limited elastic stretching. The degree of resilience may be selected so that the band portion 11 has a cushioning effect substantially comparable to that of other parts of the seat back rest with which the lumbar support is associated.

Figure 2:
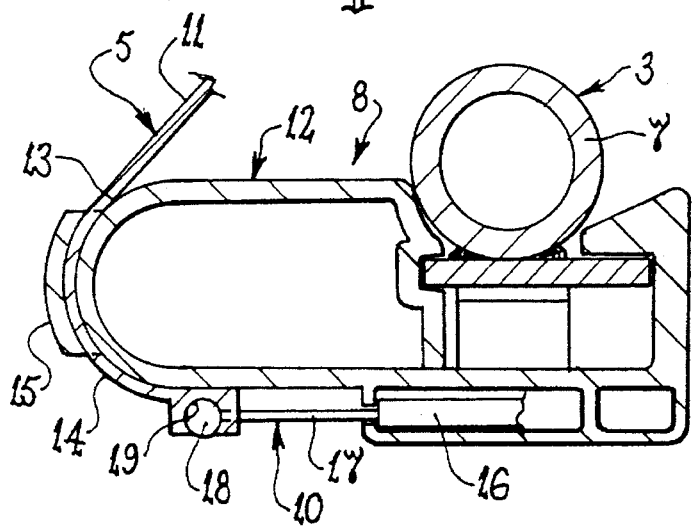
FIG. 2 is a sectional view of one form of active mounting means for an end of the lumbar support as shown in FIG. 1.

FIG. 2 shows, in cross-section, one particular form of active mounting means 8. Other forms of active mounting means could be adopted. The particular form shown includes a body or static part 12 which is attached to the frame member 7 in any appropriate fashion. A curved bearing surface 13 is formed on the body 12, and that surface is engaged by an end portion 14 of the band 5 which forms the dynamic part of the mounting means 8. The arrangement is such that the band 5 can be moved relative to the body 12 so as to thereby change the effective length of the band portion 11. Other arrangements could be adopted for that purpose. A guide 15 may overlie part of the end portion 14 so as to maintain a suitable relationship between that end portion and the body 12.

In the particular arrangement shown, the drive connection 10 includes a flexible cable of known form having a tubular cover 16 and a multi-strand wire core 17 movable longitudinally within the cover 16. Opposite ends of the cable wire 17 are attached to the band 5 and the drive mechanism 9 respectively, and any means could be adopted for that purpose. The attachment shown in FIG. 2 includes a stop member 18 which is secured to an end of the wire 17 and is located within a suitably shaped recess 19 formed in an end of the band 5. The part of the band 5 containing the recess 19 is preferably integral with the main body of the band 5.

Figure 3:
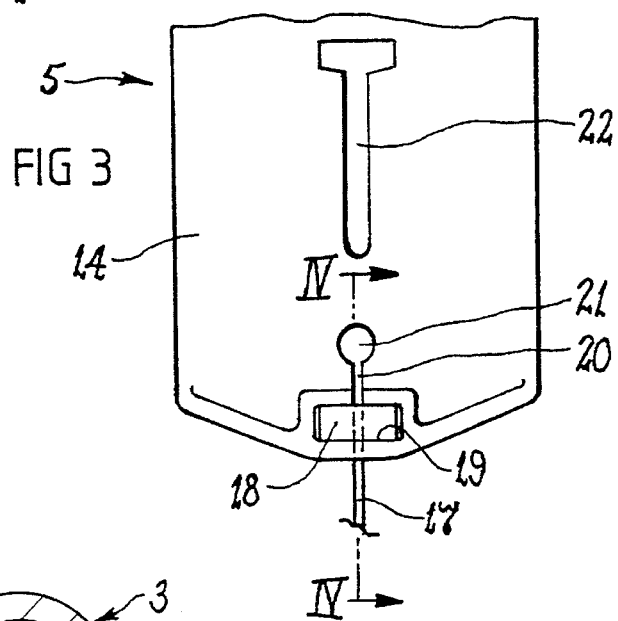
FIG. 3 is a view of an end portion of a lumbar support band according to one embodiment of the invention.
Figure 4:
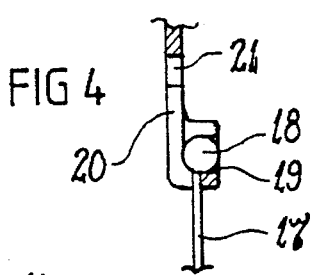
FIG. 4 is a cross-sectional view taken along line IV—IV of FIG. 3.

FIG. 3 shows the band end portion 14 and one particular arrangement for attaching and detaching the wire 17. That means includes a slot 20 and a hole 21 formed in the end portion 14. FIG. 3 also shows a longitudinal slot 22 formed through the end portion 14 which may cooperate with a suitable key in such a way as to guide the movement of the band 5 during an adjustment operation. Other guide arrangements could be adopted.

The wire 17 may have sufficient stiffness to function as push-pull device. That is, according to the operation of the mechanism 9, the wire 17 can either pull the band end portion 14 in a direction such as to shorten the length of the band portion 11, or push the band end portion 14 such as to extend the length of the band portion 11. Alternatively, the flexibility of the wire 17 may be such that it cannot effectively push the band end portion 14 to a new position of adjustment. In that alternative arrangement, operation of the adjusting means to produce an increase in the length of the band portion 11 may do no more than condition the assembly such as to permit rather than cause the length increase. The actual length increase may not occur until a person occupies the seat and presses against the seat back rest.

One particular form of mechanical drive mechanism 9 is shown in FIG. 5. That mechanism includes a body 23 having a cavity 24 therein, and a shuttle 25 is mounted within the cavity 24 for movement relative to the body 23. A stop member 26 secured to an end of the wire 17 is connected to the shuttle 25 so that movement of that shuttle to the right of FIG. 5 results in a reduction in the effective length of the band portion 11. Such movement may be effected, as shown, through a rotatable cam 27 located within an opening 28 formed in the shuttle 25. A handle 29 of any suitable form may be secured to the cam 27 to enable rotation of the cam. Obviously, other mechanical drive mechanisms could be adopted, and the particular mechanism described is open to variation.

In an alternative arrangement, the drive mechanism is electrically operated, and one such mechanism 109 is shown in FIG. 6. That mechanism 109 includes a body 123 having a cavity 124, and a shuttle 125 is slidably mounted in that cavity 124. The cable 17 may be attached to the shuttle 125 substantially as in the FIG. 5 arrangement. Longitudinal movement of the shuttle 125 is controlled by a reversible electric motor 130 which is drivably connected to the shuttle 125 in any appropriate fashion. In the particular arrangement shown, that connection includes a gearbox 131 driven by the motor 130, and a screw threaded shaft or worm 132 driven by the gearbox 131 and which engages with a cooperative screw thread formed in the shuttle 125 or a nut secured thereto. The shaft 132 extends in the direction of the shuttle, and when rotated by the motor 130 causes linear movement of the shuttle 125.

Each of the arrangements described preferably includes a friction shield over at least part of the length of the band 5 so as to facilitate movement between the operative portion 11 of that band and overlying cushioning material during adjustment of the effective length of the band portion 11. One such shield arrangement is shown diagrammatically in FIGS. 7 and 8. In that particular arrangement, the shield 40 is a flexible strip of suitable material which is secured at one end to the frame side member 7 and extends over at least part of the length (e.g., 50% to 60%) of the band 5. Any suitable retaining means may be adopted to keep the shield 40 and the band 5 in a satisfactory relationship, but in the arrangement shown that includes an aperture 41 at the free end of the shield 40 through which the band 5 extends.

As best seen in FIG. 8, the shield 40 is interposed between the band 5 and seat cushioning material 42. It is preferred, as shown, to have the shield 40 extending over the end portion of the band 5 which is driven—that is, the end portion connected to the active mounting means 8.

Figure 9:
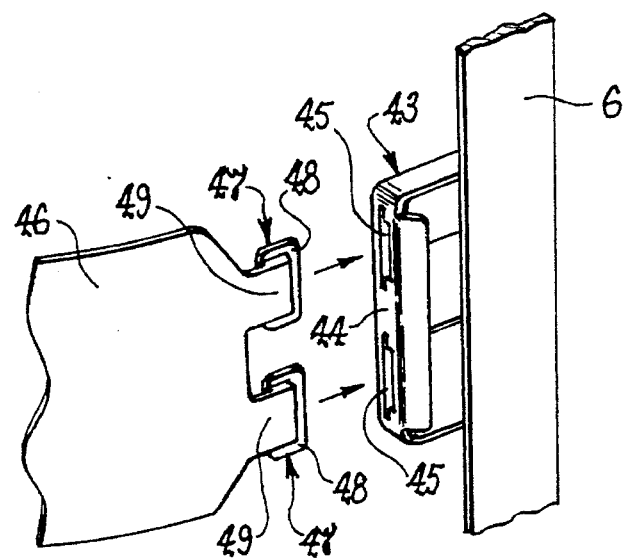
FIG. 9 shows one form of passive mounting means for a lumbar support band of the kind shown in FIGS. 1 and 7.
Figure 10:
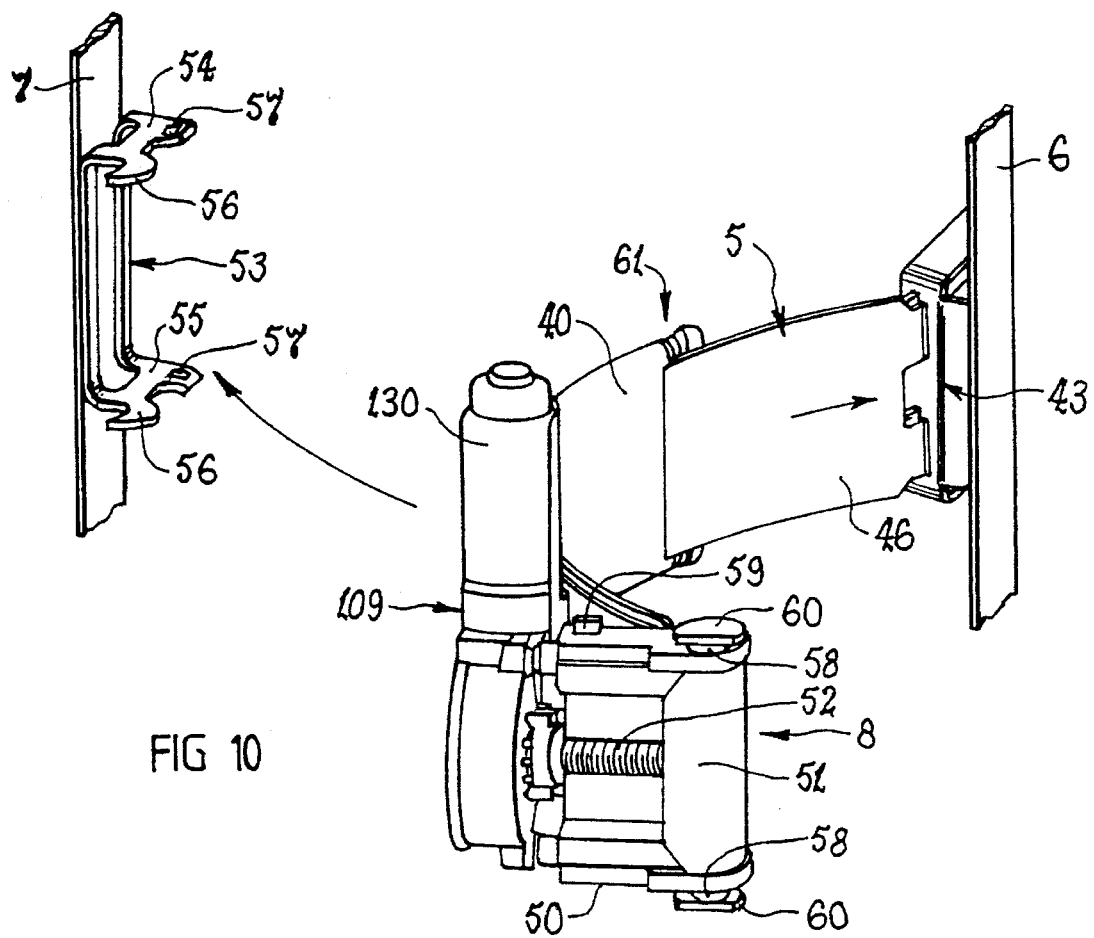
FIG. 10 is a perspective view of another embodiment of the invention which incorporates the passive mounting means of FIG. 9.
Figure 11:
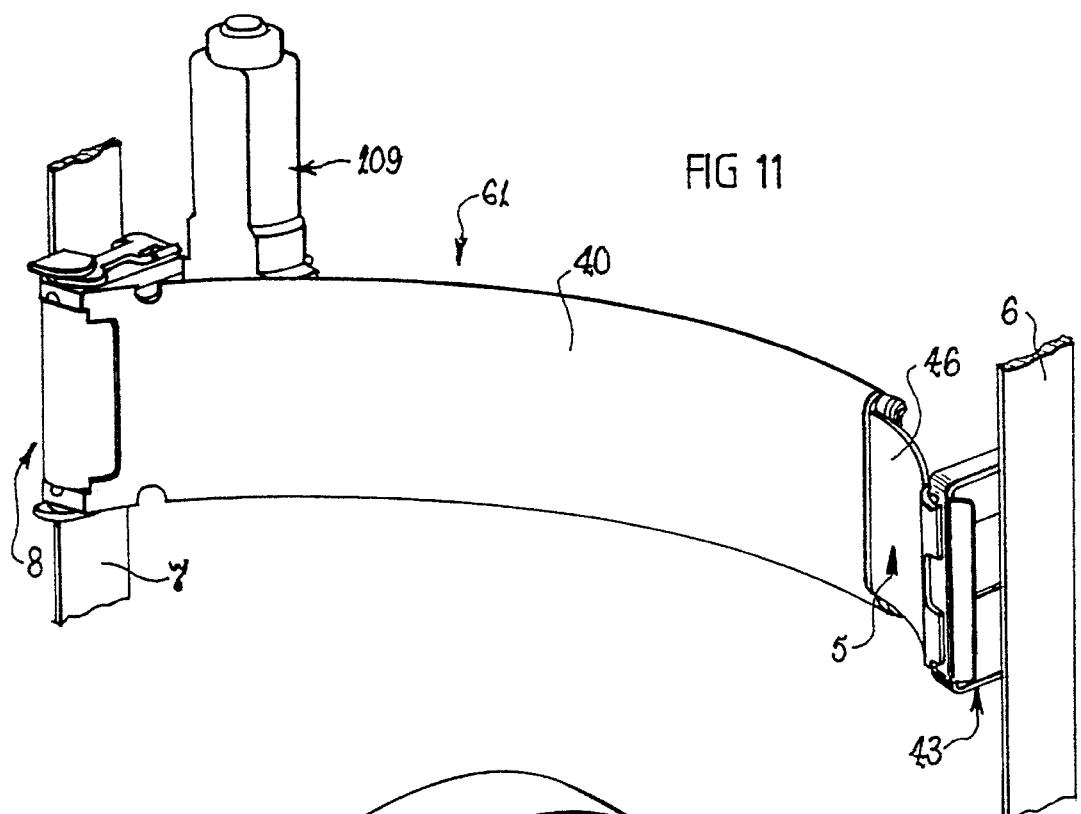
FIG. 11 is a view similar to FIG. 10 but showing both the passive and active mounting means attached to respective side members of a seat back rest frame.

The band 5 can be attached to the frame 3 in any suitable manner, but it will usually be the case that a different method of attachment is adopted for active and passive mounting means respectively. FIGS. 9 to 11 show example methods of attachment for both types of mounting means, but it will be appreciated that other forms of attachment could be adopted.

FIG. 9 shows the passive mounting means, and the attachment for that means includes a bracket 43 which is secured to the frame member 6 (shown diagrammatically) by welding or other appropriate means. The bracket 43 has an outer plate 44 through which two apertures 45 are formed. Each aperture is enlarged along one side for a reason hereinafter explained.

The end portion 46 of the band 5 which constitutes the passive mounting means has two keying elements 47, and each comprises a keying plate 48 and a neck 49 which connects the keying plate 48 to the body of the band 5. The keying elements 47 are dimensioned and shaped relative to the dimensions and shape of the apertures 45 such that each element 47 can be passed through a respective aperture 45 when the band end portion 46 is disposed as shown in FIG. 9. In particular, the keying plate 48 passes through the enlarged part of the respective aperture 45 and the neck 49 passes through the other part of the aperture 45.

When the keying elements 47 are located completely through the plate 44 as shown in FIG. 10, the band end portion 46 is turned through approximately 90° to the position shown in FIG. 11. In that relative condition of the band end portion 46, the keying elements 47 lock behind the plate 44 and prevent separation of the band 5 and the bracket 43. Such separation can be effected by turning the band end portion 46 back to a disposition as approximately shown in FIG. 10.

FIG. 10 also shows active mounting means 8 at the end of the band 5 opposite the end portion 46. The active mounting means 8 shown is of a form different to that shown in FIG. 2, but the manner of operation is essentially the same. The body or static part 50 of the mounting means 8 as shown carries a relatively slidable dynamic part 51 which is connected to a drive motor 130 through an appropriate drive connection 52.

The mounting means 8 is adapted to cooperate with an attachment bracket 53 secured to frame member 7. That bracket includes upper and lower plates 54 and 55 respectively, each having a hook-like element 56 at one side and an aperture 57 at the other. In order to cooperate with that particular form of bracket 53, the mounting means body 50 is provided with two trunnions 58 and two ratchet lugs 59. A keeper flange 60 is provided at the outer end of each trunnion 58.

When the mounting means 8 is assembled on the bracket 53 as shown in FIG. 11, each trunnion is located within the recess of a respective one of the elements 56, and each lug 59 is snap engaged within a respective aperture 57. The arrangement is such that the mounting means 8 is held firmly by the bracket 53, but can be separated from the bracket 53 as required.

It is a characteristic of one aspect of the invention, that there is provided a sub-assembly 61 which includes the band 5 and the drive mechanism 9 and which can be conveniently attached to and removed from the seat frame 1. One arrangement of that kind is shown diagrammatically by FIG. 7, another is shown by FIGS. 9 to 11, and still another is shown in FIGS. 15 and 16. The particular sub-assemblies shown by FIGS. 7 and FIGS. 9 to 11 include a shield 40 as previously described and an electrically operated drive mechanism 109. It is to be understood that the shield 40 may be omitted in some cases, and that the drive mechanism 109 could be mechanically operated.

Figure 12:
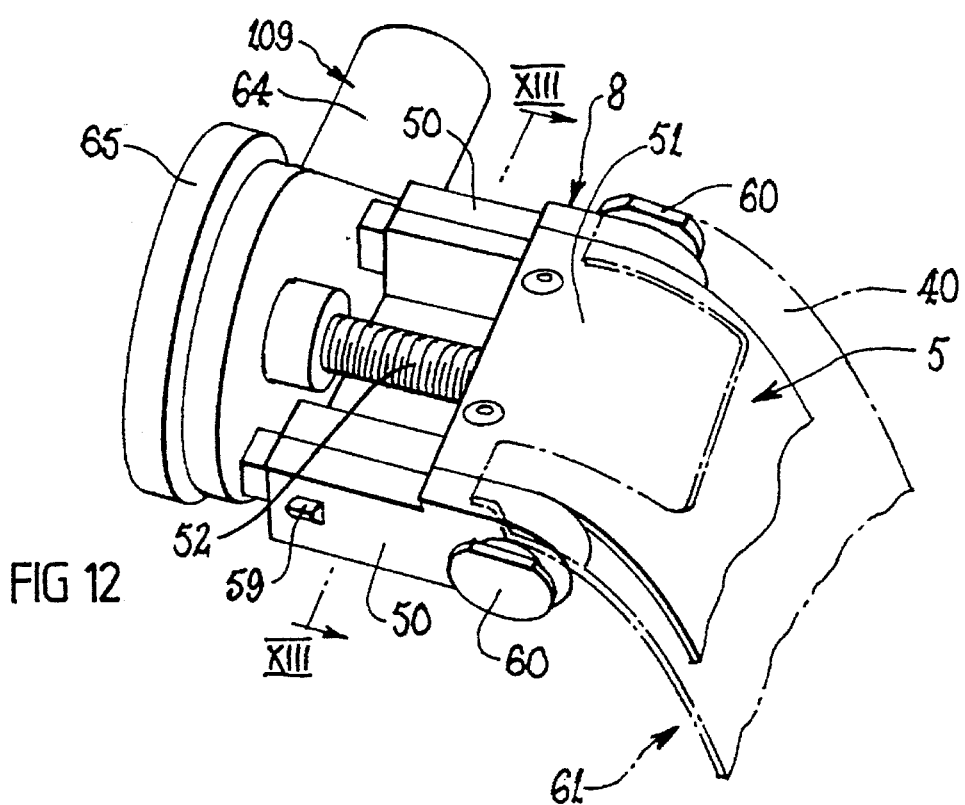
FIG. 12 is a semi-diagrammatic perspective view of one form of active mounting means.
Figure 13:
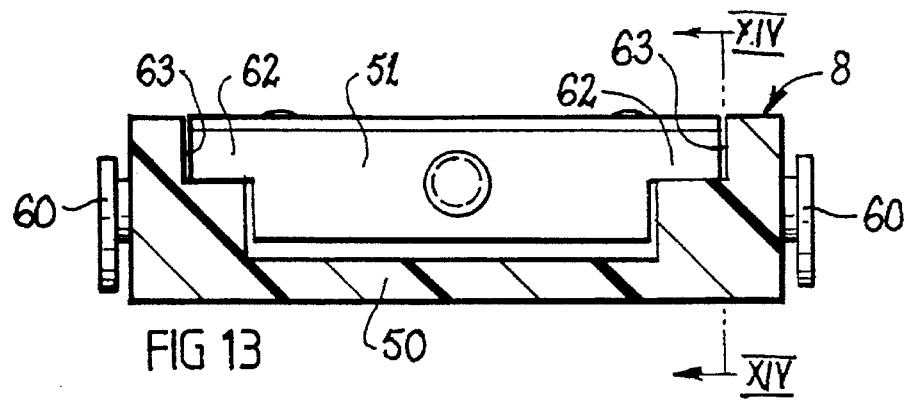
FIG. 13 is an enlarged cross-sectional view taken along line XIII—XIII of FIG. 12.
Figure 14:
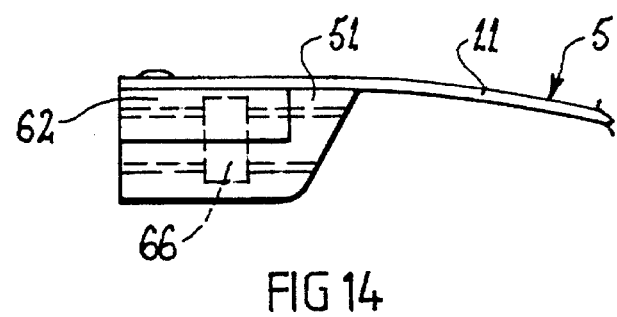
FIG. 14 is a cross-sectional view taken along line XIV—XIV of FIG. 13.

In the particular arrangement shown in FIGS. 7 and 9 to 11, the drive mechanism 109 is connected direct to the mounting means 8 rather than being located remote as in the FIG. 6 arrangement. FIGS. 12 to 14 show one possible arrangement of the drive mechanism 109 and its connection to the dynamic part 51 of the mounting means 8, and it is to be understood that other arrangements could be adopted.

The dynamic part 51 of the mounting means 8 is slidably mounted on the static part or body 50 so as to be movable relative thereto in the longitudinal direction of the band 5. For that purpose, wings 62 (FIG. 13) of the dynamic part 51 locate in respective grooves 63 of the static part 50. The dynamic part 51 may be formed integral with or otherwise secured to the strap-like portion 11 of the band 5.

The drive mechanism 109 of the particular arrangement shown in FIGS. 12 to 14, is electrically operated, and includes a reversible motor 64 and associated gearbox 65 which are secured to the static part 50 of the mounting means 8. The output of the gearbox 65 is connected to or formed by a screw threaded shaft 52 (or worm) which engages with a cooperable thread formed or provided in the dynamic part 51. That cooperable thread might be formed by a screw threaded hole formed in the dynamic part 51, or by a nut 66 (FIG. 14) moulded within or otherwise secured to the body of the dynamic part 51. The arrangement is such that rotation of the shaft 52 causes movement of the dynamic part 51 along the grooves 63 of the static part 50. Other arrangements could be adopted to achieve the same result.

Although an electrically operated drive mechanism 109 is used in the sub-assembly 61 as shown in FIGS. 9 to 12 it is to be understood that mechanically operated drive mechanisms could be adopted. In particular, a mechanically operated drive mechanism might be included in a sub-assembly which is interchangeable with a sub-assembly 61 as particularly described. As a consequence, a vehicle manufacturer can easily mount the appropriate, or requested, sub-assembly in a particular seat assembly.

A particular advantage of the sub-assembly described is that it can be constructed so as to receive any one of a number of different drive mechanisms. That is, the majority of components may be common to a number of differently driven sub-assemblies.

It is a feature of the particular arrangement described that a break-away facility is incorporated in the connection between the mounting means 8 and the cooperable bracket 53. The drive mechanism 109 formed by the motor 64 and gearbox 65, is rather bulky and projects to the back of the frame 1. In the event of impact (direct or indirect) between that drive mechanism 109 and a vehicle occupant located behind the seat carrying that mechanism, the mounting means 8 tends to break-away from the bracket 53 and swings forward within the body of the seat with which it is associated. In particular, the restraining effect of the lugs 59 is overcome and the body of the static part 50 tends to pivot inwards about the elements 56. Also, the mechanism 109 might move forward to such an extent that the trunnions 58 are completely disengaged from the elements 56.

A sub-assembly 61 of the kind described has a number of advantages. One particular advantage is that the seat frame 1 can be painted or otherwise treated without hindrance by components of the lumbar support system. The sub-assembly and the frame can then be attached when each is complete, or substantially complete, and the attachment can be achieved in a speedy and convenient manner.

Another form of interchangeable sub-assembly 161 is shown by FIGS. 15 and 16. It is a characteristic of the sub-assembly 161 that an active mounting means 108 is provided at each end of the band 105. Also, there are two shields 140, each of which is attached to a respective one of the mounting means 108. Furthermore, the arrangement shown uses a manually operable drive mechanism 170, but an electrically operated mecahnism could be adopted if preferred.

A substantially identical attaching bracket 171 is secured to each of the frame members 106 and 107, and in the example shown each includes two spaced hook-like elements 172 which locate within respective keepers 173 provided on the static part 150 of the mounting means 108. The elements 172 and the keepers 173 cooperate in such a manner that separation of the mounting means 108 from the bracket 171 can only occur when the mounting means 108 has a relative disposition of the kind shown at the right-hand side of FIG. 15. As will be seen from FIG. 16, that disposition is quite different to the disposition adopted when the sub-assembly 161 is properly installed on the seat frame. On the other hand, interchangeability of sub-assemblies 161 can be effected in a convenient manner.

FIG. 16 shows a hand wheel 174 attached to the drive mechanism 170 to allow manual operation of that mechanism.

In the particular arrangement shown in FIGS. 15 and 16, a flexible drive connection 110 is provided between the drive mechanism 170 and the dynamic part 151 of each mounting means 108. Each such drive connection 110 may have a cover 116 and a wire core 117 of the kind described in connection with FIGS. 1 to 6. That same form of connection can be adopted if an electric drive mechanism is substituted for the mechanical one shown.

Use of two active mounting means as illustrated in connection with FIGS. 15 and 16 has a number of benefits. Since both ends of the band 105 move in a like manner, the occupant of the associated seat experiences a feeling of symmetrical movement in the lumbar support as the band is adjusted one way or another. Also, the speed of adjustment is effectively doubled because of the simultaneous movement of both ends of the band. Furthermore, the actuator or power means for the drive mechanism can be attached direct to that mechanism as shown, or it may be located remote, and that applies whether the power means is manually or electrically operated.

Figure 17:
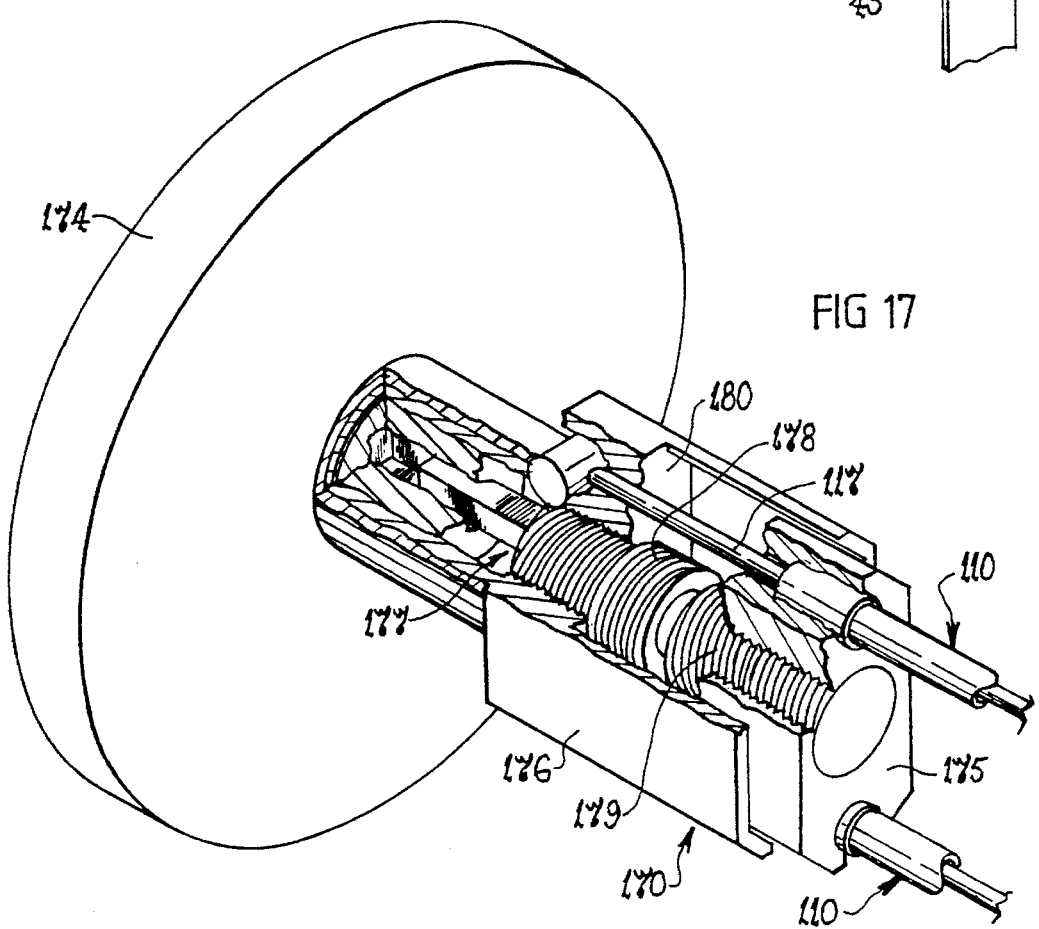
FIG. 17 is a partially sectioned semi-diagrammatic view of a drive mechanism suitable for use with the arrangement of FIGS. 15 and 16.

FIG. 17 shows one form of drive mechanism 170 suitable for use in the sub-assembly 161, or in any other embodiment of the invention. The basic components of the mechanism 170 are power means, a shuttle and a drive transmission between the power means and the shuttle. In the particular arrangement shown in FIG. 17, the power means is the hand wheel 174, the shuttle is a member 175 slidable in a housing 176, and the drive transmission is a shaft 177 having two threaded portions 178 and 179. It is to be understood that an electrically driven power means, such as a motor and gearbox, can be substituted for the hand wheel 174. Furthermore, the particular drive transmission shown, or one similar, could be adopted in the other drive mechanisms previously described.

In the FIG. 17 arrangement, the threaded portion 178 engages with a cooperable thread provided in an end wall 180 of the housing 176. The threaded portion 179 engages with a cooperable thread provided in the shuttle 175. Also, the shuttle 175 and the housing 176 cooperate so as to be held against relative rotation.

When the hand wheel 174 is rotated, there is corresponding rotation of the shaft 177 and the shuttle 175 is drawn towards or moved away from the wall 180 according to the direction of rotation. Since there are two separate threaded portions 178 and 179 of opposite hand, and each cooperates with a respective one of the two relatively movable parts—namely, the wall 180 and the shuttle 175—the rate of relative linear movement is double that achievable with the FIG. 12 arrangement. That is assuming the same pitch of thread is used in each arrangement and the same speed of rotation of the respective shafts is adopted.

It will be appreciated that the hand wheel 174 could be located remote from the drive mechanism 170 rather than being connected direct as shown in FIG. 17. In such a case, any form of drive connection may be provided between the hand wheel 174 and the shaft 177. The same applies if electrically operated power means is substituted for the manually operated hand wheel 174.

It is to be also appreciated that two or more lumbar supports according to the invention could be utilised in a single seat. That is, one such support could be located above another to give variable support to the seat occupant at two or more different zones in the height of the back rest. In such a multiple support arrangement, each lumbar support is preferably independently adjustable through separate adjusting means, but that is not essential.

Other advantages and benefits of the invention as hereinbefore described will be readily apparent to persons skilled in the relevant art.

Various alterations, modifications and/or additions may be introduced into the constructions and arrangements of parts previously described without departing from the spirit or ambit of the invention as defined by the appended claims.

I claim:

1. A lumbar support sub-assembly including a lumbar support band adapted to extend across the frame of a seat back rest having a pair of attachment means thereon, a pair of mounting means each at a respective end of said band, each of said mounting means being releasably connectable to one of said pair of attachment means on said seat back rest frame to permit said sub-assembly to be attached to and removed from said frame, said releasable connection permitting relative movement between the respective said mounting means and attachment means between a plurality of relative positions including a separable position, said respective mounting means and attachment means being separable only when in said separable position, said band including an operative portion extending between said mounting means, at least one of said mounting means having a static part which is engageable with one of said attachment means and a dynamic part which is attached to said operative portion and is movable relative to said static part whereby the effective length of said operative portion may be varied, and drive means operable to permit said dynamic part to be moved in either of two opposite directions relative to said static part.

2. A sub-assembly according to claim 1, wherein each of said pair of mounting means includes one of said static parts and one of said dynamic parts, and said drive means is operatively connected to both of said dynamic parts.

3. A lumbar support sub-assembly according to claim 1, wherein said band is in the form of a strap-like section of elastomeric polymer.

4. A seat including a back rest frame having two laterally spaced side members, a sub-assembly according to claim 1 extending transversely across said frame, and one of said attachment means being provided on each of said side members and attachably engaging with a respective one of said pair of mounting means.

5. A sub-assembly according to claim 1, wherein said drive means includes power means secured to said static part against relative movement, and force transmitting means interconnecting said power means and said dynamic part, 6. A sub-assembly according to claim 5, wherein said power means includes a reversible electric motor and said force transmitting means includes a rotatable screw threaded shaft which is drivably connected to said motor and cooperatively engages with said dynamic part so that said dynamic part is moved in one direction or another according to the direction of rotation of said shaft.

7. A lumbar support sub-assembly according to claim 1, wherein said band is in the form of a strap-like section of flexible material.

8. A lumbar support sub-assembly according to claim 7, wherein said band has a degree of elasticity so as to substantially duplicate the cushioning effect of padding and/or springs as used with a seat back rest.

9. A lumbar support sub-assembly according to claim 1, including at least one shield overlying a front surface of at least part of said operative portion, and wherein said band is movable relative to said shield.

10. A lumbar support sub-assembly according to claim 9, wherein said shield is a flexible strap-like member having one end attached to a support so as to be held against movement with said dynamic part and having an opening formed through an opposite end, and wherein said band extends through said opening.

11. A lumbar support sub-assembly according to claim 10, wherein said support is formed by said static part.

12. A lumbar support sub-assembly according to claim 10, including two of said shields, each of said shields being attached to a support, each of said shields being located adjacent to a respective end of said band.

13. A sub-assembly according to claim 1, wherein said drive means includes a housing attached to said static part, a shuttle movable relative to said housing, and a drive connection between said shuttle and said dynamic part.

14. A sub-assembly according to claim 13, wherein said drive connection includes a flexible cable having a tubular cover and a core member movable longitudinally with said tubular cover, the opposite ends of said cable being connected to said shuttle and said dynamic part, respectively.

15. A sub-assembly according to claim 13, wherein each of said pair of mounting means includes one of said static parts and one of said dynamic parts, said drive means being connected to both of said dynamic parts, and including a second drive connection interconnecting said shuttle and each of said dynamic parts.

16. A sub-assembly according to claim 13, wherein said drive means includes power means which is operable to cause said shuttle to move in either of two opposite directions relative to said housing, and a rotatable screw device interconnecting said power means and said shuttle and through which said shuttle is caused to respond to operation of said power means.

17. A sub-assembly according to claim 16, wherein said screw device includes a shaft having two threaded portions, the thread of one of said portions having a first hand and engaging a first cooperable thread portion provided on said shuttle, and the thread of the other of said portions having a second hand opposite said first hand and engaging a second cooperable thread portion provided on said housing.

18. A sub-assembly according to claim 16, wherein said power means includes a manually operable device.

19. A sub-assembly according to claim 16, wherein said power means includes a reversible electric motor.

\* \* \* \* \*